United States Patent
Hallor et al.

(10) Patent No.: US 9,667,183 B2
(45) Date of Patent: May 30, 2017

(54) ELECTRONICALLY COMMUTATED ELECTRIC MOTOR

(75) Inventors: Mattias Hallor, Markgroeningen (DE); Ulrich Vollmer, Weilheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 296 days.

(21) Appl. No.: 14/342,827

(22) PCT Filed: Aug. 31, 2012

(86) PCT No.: PCT/EP2012/067010
§ 371 (c)(1),
(2), (4) Date: Mar. 5, 2014

(87) PCT Pub. No.: WO2013/034503
PCT Pub. Date: Mar. 14, 2013

(65) Prior Publication Data
US 2014/0191694 A1    Jul. 10, 2014

(30) Foreign Application Priority Data
Sep. 5, 2011   (DE) .......................... 10 2011 082 141

(51) Int. Cl.
*H02P 6/10*   (2006.01)
*H02P 6/18*   (2016.01)

(52) U.S. Cl.
CPC . *H02P 6/18* (2013.01); *H02P 6/10* (2013.01)

(58) Field of Classification Search
CPC .................................... H02P 6/10; H02P 6/18
(Continued)

(56) References Cited

U.S. PATENT DOCUMENTS 5,986,417 A * 11/1999 Nicolai .................. H02P 25/14
                                                        318/245
6,940,242 B1    9/2005 Maslov et al.
(Continued)

FOREIGN PATENT DOCUMENTS

DE          10106944           9/2002
DE          102010001241       10/2010

OTHER PUBLICATIONS

International Search Report for Application No. PCT/EP2012/067010 dated Jul. 5, 2013 (English Translation 2 pages).

*Primary Examiner* — Kawing Chan
(74) *Attorney, Agent, or Firm* — Michael Best & Friedrich LLP

(57) ABSTRACT

Presented is an electronically commutated electric motor having a power output stage connected to a stator of the electric motor, and a processing unit connected to the power output stage. The processing unit drives the power output stage to produce at least one stator current. The electric motor has a current sensor which is designed to record the stator current produced by the power output stage and to generate a current signal representing the stator current. The processing unit is designed to use the current sensor to record at least one current value of the current at a recording time within an interval of time and to determine a current profile of the current in the interval of time at least on the basis of the current value and to drive the power output stage to energize the stator on the basis of the current profile determined.

11 Claims, 3 Drawing Sheets

(58) Field of Classification Search
 USPC .............................. 318/400.01, 400.32, 700
 See application file for complete search history.

(56) References Cited

U.S. PATENT DOCUMENTS

| | | |
|---|---|---|
| 2009/0033260 A1 | 2/2009 | Fernengel et al. |
| 2010/0259203 A1 | 10/2010 | Hogg et al. |
| 2011/0057593 A1* | 3/2011 | Williams .................. H02P 6/18 |
| | | 318/400.26 |
| 2011/0166719 A1* | 7/2011 | Pasek ....................... G01D 4/00 |
| | | 700/291 |

* cited by examiner

ELECTRONICALLY COMMUTATED ELECTRIC MOTOR

BACKGROUND OF THE INVENTION

The invention relates to an electronically commutated electric motor. The electric motor preferably has a stator and a rotor, which is designed in particular with a permanent magnet. The electronically commutated electric motor has a power output stage preferably connected to the stator, and a processing unit connected to the power output stage. The processing unit is designed to drive the power output stage, in particular in a pulse-width-modulated manner, to generate at least one stator current, in particular by generating at least one or more AC voltages. The output side of the power output stage is preferably connected to the stator. The processing unit can thus drive the power output stage to energize the stator and to generate a rotating magnetic field by means of the stator.

SUMMARY OF THE INVENTION

According to the invention, the electric motor has a current sensor connected to the processing unit, said current sensor being designed to detect the stator current generated by the power output stage and to generate a current signal representing the stator current. The processing unit is designed to detect, by means of the current sensor, at least one, or only one, current value of the current at a detection instant within a time interval, in particular a pulse-width-modulation period, and to determine a current profile of the current in the time interval, at least on the basis of the current value, or additionally on the basis of a voltage and an impedance comprising an inductor and/or a nonreactive resistor of stator coils of the stator, and to drive the power output stage to energize the stator on the basis of the determined current profile.

By means of the current sensor mentioned above, the electric motor of the type mentioned at the outset may advantageously have no torque ripple or only have it to a small extent, wherein a torque ripple is a variation in torque over time, in particular amplitude modulation of a torque over time. The variation in torque is brought about in particular by an unbalanced drive of the stator coils of the stator by the processing unit. The unbalanced drive is caused for example by an imprecisely determined actual current value of an energization state of the stator.

By means of the electric motor designed in this way with reduced torque ripple or none at all, the electric motor may also not emit any airborne sound at a frequency of the torque ripple via parts connected to the motor shaft of the electric motor. Therefore, the electric motor with the current sensor designed in this way emits less airborne sound during operation and thus leads to lower noise emissions. Furthermore, in the case of a power steering system which is connected to the electric motor, the electric motor designed in this way advantageously provides improved haptics.

Preferably, the processing unit is designed to form, from the current profile, an average value of the current in the time interval composed of currents determined during time periods of the time interval. The processing unit is also designed to drive the power output stage on the basis of the average value. In this case, a voltage connected from the power output stage to the stator is preferably constant during the time period.

By means of the formation of the average value, outlay in terms of detection and processing for the current detection can advantageously be kept to a minimum, with the result that some calculating capacity of the processing unit still remains for further processing tasks.

In a preferred embodiment, the processing unit is designed to determine an electric charge flowing during a time period and to determine the average value of the current on the basis of a sum of the charges flowing during the time period in the time interval. As a result, the average value of the current can advantageously be precisely determined.

In a preferred embodiment of the electric motor, the number of time periods corresponds to a number of possible switching states, which are different from one another, of a voltage connected to the stator coils of the stator. For example, each stator coil can take two switching states, for example one switching state in which an intermediate-circuit voltage is applied to the stator coil and another switching state in which no voltage is applied to the stator coil. Advantageously, the number of current values used for forming the average value, in particular the number of flowing amounts of charge, is formed by means of the formation of the average value for the time periods of possible switching states which are different from one another in order to generate a high precision of the average value.

In a preferred embodiment, the electric motor has a temperature sensor connected to the processing unit. The temperature sensor is designed to detect a temperature of at least one part of the electric motor, in particular the stator and/or the power output stage, and to generate a temperature signal representing the temperature. Preferably, the processing unit is designed to detect the current value for determining the current profile on the basis of the temperature signal, preferably on the basis of a change in the temperature signal representing a change in temperature. It is further preferred that a new current average value for driving the power output stage and thus for energizing the stator is then advantageously implemented only if a change in temperature, in particular a predefined change in temperature, represented by the temperature signal, is present. By means of the temperature-dependent detection of a current value, from which, after detection for a predefined time interval, an average value is formed for time periods which are different from one another, the calculation loading of the processing unit can advantageously be kept as low as possible.

In particular, it has been realized that the electrical properties of the stator coils, in addition the electrical properties of the power output stage, depend on an ambient temperature of the stator or of the power output stage. An impedance of the stator or of the semiconductor components contained in the power output stage also changes with the electrical properties. The temporal profile of the torque output by the electric motor, in particular a possible torque ripple of the torque, thus depends substantially on a temperature of the stator and/or of the power output stage.

In a preferred embodiment, the current sensor is formed by a resistor, in particular a shunt resistor. The resistor is connected, in particular, in series with the power output stage.

The invention also relates to a method for operating an electronically commutated electric motor, in which stator coils of an electric motor for generating a rotating magnetic field are wired in a pulse-width-modulated manner to a voltage. In the case of the method, a current value of a current flowing through the stator coils at a detection instant in a time interval is detected and a current profile of the current in the time interval is determined and the stator coils are wired on the basis of the determined current profile.

In a preferred embodiment of the method, an average value of the current in the time interval composed of currents determined during time periods of the time interval is formed from the current profile and the stator coils are driven on the basis of the average value, wherein switching states of the stator coils during the time period are unchanged in each case. As a result, a voltage connected in each case to a stator coil is unchanged during the time period.

Preferably, in the case of the method, an electric charge flowing during a time period is determined and the average value of the current is determined on the basis of a sum of the charges flowing during the time periods in the time interval.

Preferably, a temperature of at least one part of the electric motor, in particular a power output stage and/or a stator, is detected and a temperature signal representing the temperature is generated. Furthermore, the current value for determining the current profile on the basis of the temperature signal, in particular of a change in the temperature signal representing a change in temperature, is detected.

The invention will now be described below on the basis of figures and further exemplary embodiments.

DETAILED DESCRIPTION OF THE DRAWINGS

Exemplary embodiments of the present invention are described in greater detail below with reference to the figures.

Figure 1:
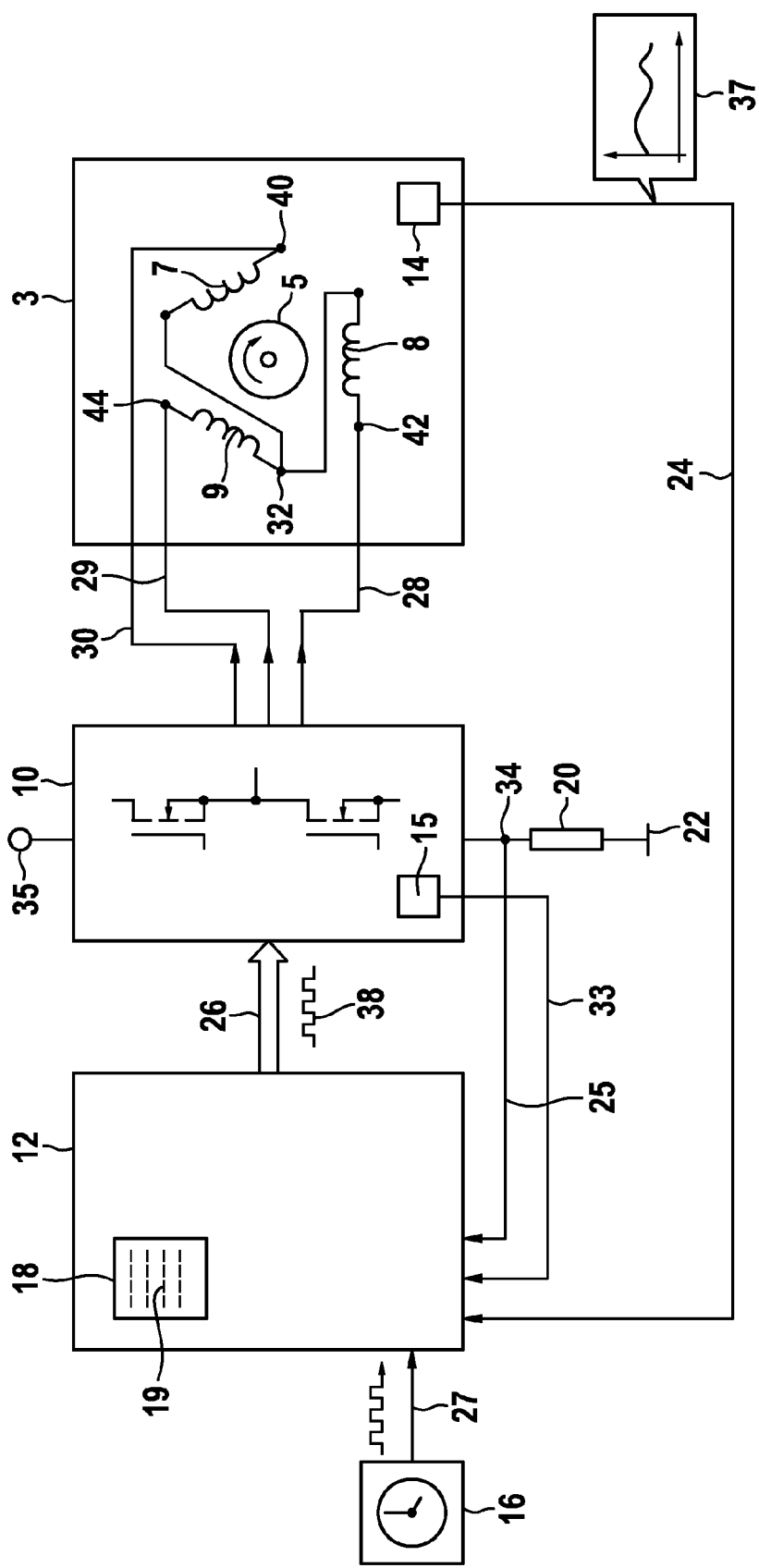
FIG. 1 shows one embodiment of an electric motor.

FIG. 1 shows an exemplary embodiment of an electric motor 1. The electric motor 1 has a stator 3 and a rotor 5, which is designed with a permanent magnet. The electric motor 1 also has a power output stage 10, the output side of which is connected to the rotor 5 and, there, to stator coils 7, 8 and 9 of the stator 3. The power output stage 10 has a connection 35 for an intermediate-circuit voltage. The power output stage 10 is connected to a ground connection 22 via a connection node 34 via a shunt resistor 20. The shunt resistor 20 forms a current detection element. The processing unit 12 is connected to the power output stage 10 via a connection 26 which is, in particular, designed to be multi-channeled, and is designed to drive the power output stage 10, in particular control connections of semiconductor switches of the power output stage 10, in a pulse-width-modulated manner to energize the stator 3 and thus to generate a rotating magnetic field in order to move the rotor 5 in rotation and to generate a pulse-width-modulated control signal 38 for this purpose.

By way of example, the semiconductor switches are formed in each case by an IGBT transistor or a field-effect transistor, in particular MOSFET (MOSFET=metal-oxide semiconductor field-effect transistor) or MISFET (MISFET=metal-insulated semiconductor field-effect transistor).

By way of example, the processing unit 12 is formed by a microprocessor, a microcontroller, an ASIC (ASIC=application-specific integrated circuit) or an FPGA (FPGA=field-programmable gate array).

The connection node 34 is connected to the processing unit 12 via a connection line 25. The processing unit 12 can receive a current signal via the connection line 25, said current signal representing a voltage dropping across the shunt resistor 20 and therefore a current flowing through the power output stage 10. The input side of the processing unit 12 is connected to a clock 16 via a connection line 27. The clock 16 is formed, for example, from a crystal oscillator and is designed to generate a time signal representing a time interval and to transmit said time signal to the processing unit 12. The processing unit 12 is connected to a store 18 for data sets, from which a data set 19 is identified by way of example. In this exemplary embodiment, the data set 19 represents a current value at a detection instant, which current value has been detected by the shunt resistor 20 as current sensor.

The output side of the power output stage 10 is connected to a first connection 40 of the stator coil 7 via a connection line 30, to a first connection 42 of the stator coil 8 via a connection line 28, and to a first connection 44 of the stator coil 9 via a connection line 29. The electric motor 1 also has a temperature sensor 14 which is arranged and designed to detect a temperature of the stator 3 and to generate a temperature signal 37 representing the temperature and to transmit said temperature signal to the processing unit 12 via a connection line 24. The electric motor 1 also has a temperature sensor 15 which is arranged and designed to detect a temperature of the power output stage 10 and to generate a temperature signal representing the temperature of the power output stage 10 and to transmit said temperature signal to the processing unit 12 via a connection line 33.

The processing unit 12 is designed to form, from the current signal received from the shunt resistor 20, on the basis of the temperature signal and the time signal, a current value at a detection instant within a time interval, in particular a pulse-width-modulation period, while the power output stage 10 is being driven and to generate the data set 19 which represents the current value.

The processing unit 12 is also designed to determine a current profile of the current in the time interval on the basis of the current value represented by the data set 19, to determine an average value of the current in the time interval on the basis of the determined current profile, and to drive the power output stage 10 on the basis of the current value to energize the stator 3. An example of the determination is described in the following FIGS. 2 and 3.

The processing unit is designed, for example, to drive the stator 3 to generate the rotating magnetic field on the basis of the determined average value, as long as no change in temperature has been detected by means of the temperature signals from the temperature sensors 14 or 15. In the event that a change in temperature is detected, the processing unit 12 can determine the average value of the current in the time interval again and further drive the power output stage 10 on the basis of the newly determined average value.

Figure 2:
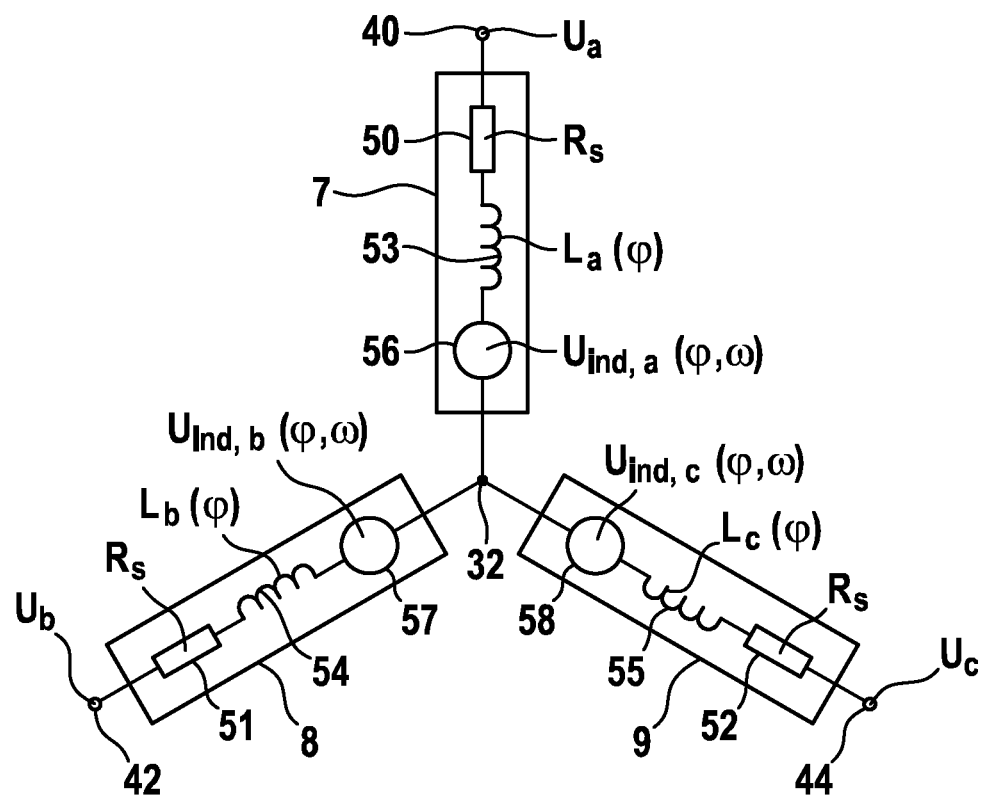
FIG. 2 shows one embodiment of a circuit arrangement of an equivalent circuit diagram of an electric motor having three stator coils.

FIG. 2 shows an exemplary embodiment of a circuit arrangement of an equivalent circuit diagram of an electric motor having three stator coils. Each stator coil has an inductor and a nonreactive resistor which are connected in series with a voltage source, wherein the voltage source represents a voltage induced in the stator coil.

A first connection 40 of the stator coil 7 illustrated in FIG. 1 has an intermediate-circuit voltage Ua applied to it in a pulse-width-modulated manner by the power output stage 10. The connection 40 is connected to an inductor 53 of the stator coil 7 via a nonreactive resistor 50 of the stator coil 7, which is connected to the neutral-point connection 32 via a voltage source 56 representing the voltage induced in the stator coil 7. A first connection 42 of the stator coil 8 illustrated in FIG. 1 has an intermediate-circuit voltage Ub applied to it in a pulse-width-modulated manner by the power output stage 10. The connection 42 is connected to an inductor 54 of the stator coil 8 via a nonreactive resistor 51 of the stator coil 8, which is connected to the neutral-point connection 32 via a voltage source 57 representing the voltage induced in the stator coil 8. A first connection 44 of the stator coil 9 illustrated in FIG. 1 has an intermediate-circuit voltage Uc applied to it in a pulse-width-modulated manner by the power output stage 10. The connection 44 is connected to an inductor 55 of the stator coil 9 via a nonreactive resistor 52 of the stator coil 9, which is connected to the neutral-point connection 32 via a voltage source 58 representing the voltage induced in the stator coil 9.

The following applies to the connection 40:

$$U_a - U_Y = R_S \cdot I_a + L_a(\varphi)\frac{dI_a}{dt} + \frac{dL}{d\varphi}\omega \cdot I_a + U_{ind,a}(\varphi, \omega) \quad (1)$$

Ignoring harmonics, a neutral-point voltage of the neutral point 32 approximately corresponds to an average value of an applied intermediate-circuit voltage:

$$U_Y = \frac{U_a + U_b + U_c}{3} \quad (2)$$

Ignoring harmonics, an angle-dependent inductance is approximately:

$$L_a(\varphi) = \frac{L_d + L_q}{2} + (L_d - L_q) \cdot \cos(2\varphi_{el}) \quad (3)$$

The induced voltage is then:

$$U_{ind,a}(\varphi,\omega) = -\Psi_{pm}\sin(\varphi_{el}) \quad (4)$$

The voltages induced in the stator coils of the stator are in each case phase-shifted by 120 degrees relative to one another.

For simplicity, it is assumed that an induced voltage and an inductance of the stator coils are constant over the time interval, in particular a PWM period.

For the determination of the voltage drop across the nonreactive resistor, a constant phase current in the time interval is assumed.

The time interval can be divided into time periods which are different from one another and in which either the intermediate-circuit voltage or no voltage is present at the connections of the stator coils in each case.

The following is assumed for the phase current:

$$\frac{dI_a}{dT} = \frac{\Delta I_a}{\Delta t} \quad (5)$$

A change in current can then be determined for each time period of the time interval:

$$\Delta I_a = \frac{U_a - \frac{U_a + U_b + U_c}{3} - R_S \cdot I_a - U_{ind,a}(\varphi, \omega)}{L_a(\varphi)} \quad (6)$$

In the equations:
$U_Y$=neutral-point voltage at the connection node 32;
$U_a$=voltage, in particular intermediate-circuit voltage, at phase a, in particular stator coil 7;
$I_a$=current through the stator coil 7 in phase a;
$R_s$=nonreactive resistor 51, 52 or 53 of a stator coil of the stator coils 7, 8 and 9;
$L_a(\varphi)$=rotor angle-dependent inductance 53 of the stator coil 7;
$U_{ind,a}(\varphi,\omega)$=voltage 56, dependent on rotor angle $\varphi$ and a circuit frequency $\omega$, induced in the stator coil 7;
$\varphi_{el}$=electrical rotor angle position
$\Psi_{pm}$=magnetic flux of the pulse-width modulation;
$L_d$=motor-specific inductance in a d-q coordinate system in the d direction;
$L_q$=motor-specific inductance in a d-q coordinate system in the q direction.

An equation analogous to equation 1 applies to the connections 42 and 44, in particular the motor phases b and c, with current, voltages and inductance for the phases b and c.

Figure 3:
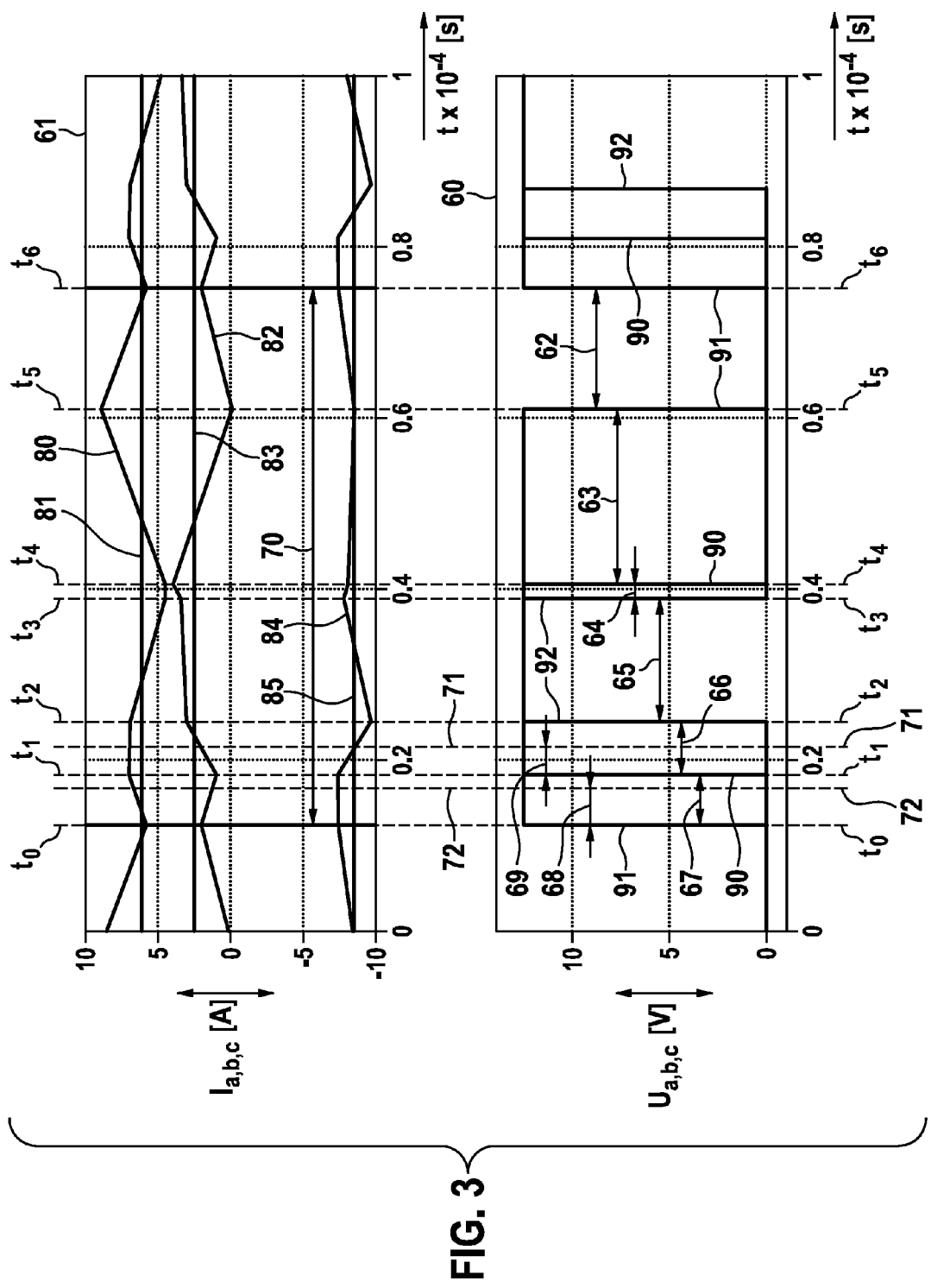
FIG. 3 shows a graph illustrating the currents flowing in the stator coils and the temporal voltage profiles connected to the stator coils.

FIG. 3 shows a graph which illustrates the currents flowing in the stator coils and the temporal voltage profiles connected to the stator coils.

In the time periods of the time interval, in particular the pulse-width-modulation periods, the stator coils have the intermediate-circuit voltage Uzk applied thereto as follows, for example by the power output stage 10 in FIG. 1, in accordance with the following table:

| Time period | 1 | 2 | 3 | 4 | 5 | 6 |
|---|---|---|---|---|---|---|
| Ua = | 0 | Uzk | Uzk | Uzk | 0 | 0 |
| Ub = | Uzk | Uzk | Uzk | Uzk | Uzk | 0 |
| Uc = | 0 | 0 | Uzk | 0 | 0 | 0 |

The change in current can be determined for each of the six time periods according to equation (6).

An average current value of a current of a stator coil in the time interval is:

$$I_{mean} = \frac{1}{t_{period}}\sum_{k=0}^{5}\frac{(I_k + I_{k+1}) \cdot (t_{k+1} - t_k)}{2} \quad (7)$$

$$I_0 = I_{measured} - \frac{\Delta I_1 \cdot t_{sample}}{t_1 - t_0}$$

$$I_{k+1} = I_k + \Delta I_{k+1}$$

wherein:
$t_0 \ldots t_6$=switchover instant of the pulse-width modulation of the power output stage;
$I_0 \ldots I_6$=instantaneous current values at the instants $t_0 \ldots t_6$;
$I_{measured}$=detected current value;
$I_{mean}$=average value of the current in the time interval;
$t_{period}$=duration of the time interval, in particular PWM period;
$t_{sample}$=instant at which $I_{measured}$ is detected;
$\Delta I_k$=change in current between two consecutive instants of the instants $t_0 \ldots t_6$ according to equation (6).

For the phase b, the stator coil 8 in the example from FIG. 1, the processing unit 12 in FIG. 1 can determine the currents as follows:

$$I_{b,mean} = \frac{1}{t_{period}} \sum_{k=0}^{5} \frac{(I_{b,k} + I_{b,k+1}) \cdot (t_{b,k+1} - t_{b,k})}{2} \quad (8)$$

Equation 8 thus represents a sum of the electric charges which are flowing in phase b, for example in the stator coil 8 and are totaled in the time intervals, divided by the duration of the time interval, resulting in the average current in phase b, for example the stator coil 8.

The current in phase b at the instant $t_0$ is then:

$$I_{b,0} = I_{b,measured} - \frac{\Delta I_{b,1} \cdot t_{b,sample}}{t_{b,1} - t_{b,0}} \quad (9)$$

The current in phase b in the subsequent time period k+1 is as follows:

For phase c, for example for the stator coil 9, the following applies:

$$I_{c,mean} = \frac{1}{t_{period}} \sum_{k=0}^{5} \frac{(I_{c,k} + I_{c,k+1}) \cdot (t_{c,k+1} - t_{c,k})}{2} \quad (10)$$

$$I_{c,0} = I_{c,measured} - \frac{\Delta I_{c,2} \cdot t_{sample}}{t_{c,2} - t_{c,1}} \quad (11)$$

$$I_{c,k+1} = I_{c,k} + \Delta I_{c,k+1}$$

The current in phase c at the instant $t_0$ is as follows:

$$I_{c,0} = I_{c,1} + \Delta I_{c,1}.$$

The graph 61 illustrates the pulse-width-modulated voltages connected from the power output stage 10 to the stator 3. A voltage profile 90 generated by means of pulse-width modulation corresponds to an intermediate-circuit voltage Ua applied to the connection 40 of the stator coil 7. A voltage profile 91 generated by means of pulse-width modulation corresponds to an intermediate-circuit voltage Ub applied to the connection 42 of the stator coil 8. A voltage profile 92 generated by means of pulse-width modulation corresponds to an intermediate-circuit voltage Uc applied to the connection 44 of the stator coil 9. The instants of switchover of the power output stage, by means of which the previously mentioned time periods of the time interval 70 are determined, are denoted t0, t1, t2, t3, t4, t5 and t6. The time periods 62, 63, 64, 65, 66 and 67 of the time interval 70 can in each case be calculated from a difference between the time periods t1, t2, t3, t4 and t5 from the start instant t0. An instant 71 corresponds to the detection instant at which the current of stator coil 7, that is to say phase a, has been detected. An instant 72 corresponds to the detection instant at which the current of stator coil 8, that is to say phase b, has been detected.

The detection instant 71 is defined by the processing unit 12 in FIG. 1 by means of a time period 69 which corresponds to the duration after a start of the pulse-width-modulation period of the voltage profile 90. The detection instant 72 is defined by the processing unit 12 in FIG. 1 by means of a time period 68 which corresponds to the duration after a start of the pulse-width-modulation period of the voltage profile 91.

The graph 61 shows a curve 80 which represents a current profile of a current, determined by the processing unit 12, through the stator coil 7. A straight line 81 represents the average value over time, determined by the processing unit 12, of the current profile 80 within the time interval 70.

A curve 82 represents a current profile of a current, determined by the processing unit 12, through the stator coil 8. The current profile has been determined on the basis of the current value of the current through the stator coil 8, detected at the detection instant 72. A straight line 83 represents the average value over time, determined by the processing unit 12, of the current profile 82 within the time interval 70.

A curve 84 represents a current profile of a current, determined by the processing unit 12, through the stator coil 9. The current profile has been determined on the basis of the current value of the current through the stator coil 9, detected at the detection instant 71. A straight line 85 represents the average value over time, determined by the processing unit 12, of the current profile 84 within the time interval 70.

The invention claimed is:

1. An electronically commutated electric motor comprising: a stator;
a rotor;
a processing unit electrically coupled to a power output stage of the electronically commutated electric motor, wherein the processing unit is designed to drive the power output stage to generate at least one stator current;
a current sensor electrically coupled to the processing unit, said current sensor configured to
detect the stator current generated by the power output stage, and
generate a current signal representing the stator current;
wherein the processing unit is configured to
detect, with the current sensor, at least one current value of the stator current at a detection instant within a time interval,
determine an average value of the stator current;
determine a current profile including discrete values of the stator current in the time interval based on current values of the stator current within the time interval and on the basis of a voltage difference between the power output state and the stator, and an impedance comprising an inductor and/or nonreactive resistor of stator coils of the stator; and
drive the power output stage to energize the stator on the basis of the determined current profile.

2. The electronically commutated electric motor as claimed in claim 1, wherein the processing unit is configured to
generate, from the current profile, an average value of the current in the time interval composed of currents determined during time periods of the time interval, and
drive the power output stage on the basis of the average value, wherein a voltage difference between the power output stage and the stator is constant during the time period.

3. The electronically commutated electric motor of claim 2, wherein the processing unit is configured to determine an electric charge flowing during a time period and to determine the average value of the current on the basis of a sum of the electric charges flowing during the time periods in the time interval.

4. The electronically commutated electric motor of claim 2, wherein the time periods corresponds to a switching states of the stator coils of the stator.

5. The electronically commutated electric motor of claim 1, wherein the electric motor includes a first temperature sensor and a second temperature sensor electrically coupled to the processing unit, the first temperature sensor configured to detect a first temperature of the stator, and generate a first temperature signal representing the first temperature of the stator, and the second temperature sensor configured to detect a second temperature of the power output stage, and generate a second temperature signal representing the second temperature of the power output stage; and wherein the processing unit is configured to detect the current value for determining the current profile on the basis of the first temperature signal and the second temperature signal.

6. The electronically commutated electric motor of claim 1, wherein the current sensor includes a resistor connected to the power output stage.

7. A method for operating an electronically commutated electric motor, the method comprising:

detecting, with a processing unit, a stator current generated by a power output stage of the electronically commutated electric motor;

detecting, with a current sensor, at least one current value of the stator current at a detection instant within a time interval;

determining, with the processing unit, an average value of the stator current, and a current profile including discrete values of the stator current in the time interval based on current values of the stator current within the time interval;

driving the power output stage to energize the stator on the basis of the determined current profile; and determining the current profile on the basis of a voltage difference between the power output state and the stator, and an impedance comprising an inductor and/or nonreactive resistor of stator coils of the stator.

8. The method as claimed in claim 7, in which average value of the current in the time interval composed of currents determined during time periods of the time interval is formed from the current profile and the stator coils are driven on the basis of the average value, wherein switching states of the stator coils during the time period are unchanged.

9. The method as claimed in claim 7, wherein an electric charge flowing during a time period is determined and the average value of the current is determined on the basis of a sum of the charges flowing during the time periods in the time interval.

10. The method as claimed in claim 7, further comprising:

detecting, with a first temperature sensor, a first temperature of the stator;

generating a first temperature signal representing the first temperature of the stator;

detecting, with a second temperature sensor, a second temperature of the power output stage;

generating a second temperature signal representing the second temperature of the power output stage; and determining the current profile on the basis of the first temperature signal and the second temperature signal.

11. An electronically commutated electric motor, the electronically commuted electric motor comprising:

a stator;

a rotor;

a processing unit electrically coupled to a power output stage of the electronically commuted electric motor;

a current sensor including a resistor in series with the power output stage, the current sensor connected to the processing unit and configured to detect the at least one stator current generated by the power output stage, and generate a current signal representing the stator current; and wherein the processing unit is configured to receive the current signal representing the at least one stator current at a detection instant within a time interval, store a plurality of current values associated with the current signal, generate a current profile including discrete values of the stator current in the time interval based on the plurality of current values, determine an average value of the stator current based on the current profile, and drive the power output stage to energize the stator using the average value of the stator current;

wherein the electric motor includes a first temperature sensor and a second temperature sensor electrically coupled to the processing unit;

wherein the first temperature sensor configured to detect a first temperature of the stator, and generate a first temperature signal representing the temperature of the stator;

wherein the second temperature sensor configured to detect a second temperature of the power output stage, and generate a second temperature signal representing the temperature of the power output stage; and wherein the processing unit is configured to detect the current value for determining the current profile on the basis of the first temperature signal and the second temperature signal.

* * * * *